Figure 1:
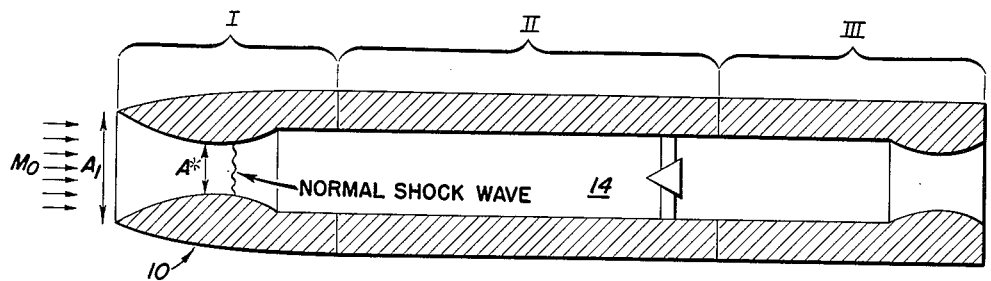

March 6, 1962 G. J. PIETRANGELI ET AL 3,023,571
CASCADE DIFFUSER
Filed July 20, 1955 3 Sheets-Sheet 1

INVENTORS
GENE J. PIETRANGELI
RANDOLPH S. RAE
BY
ATTORNEYS

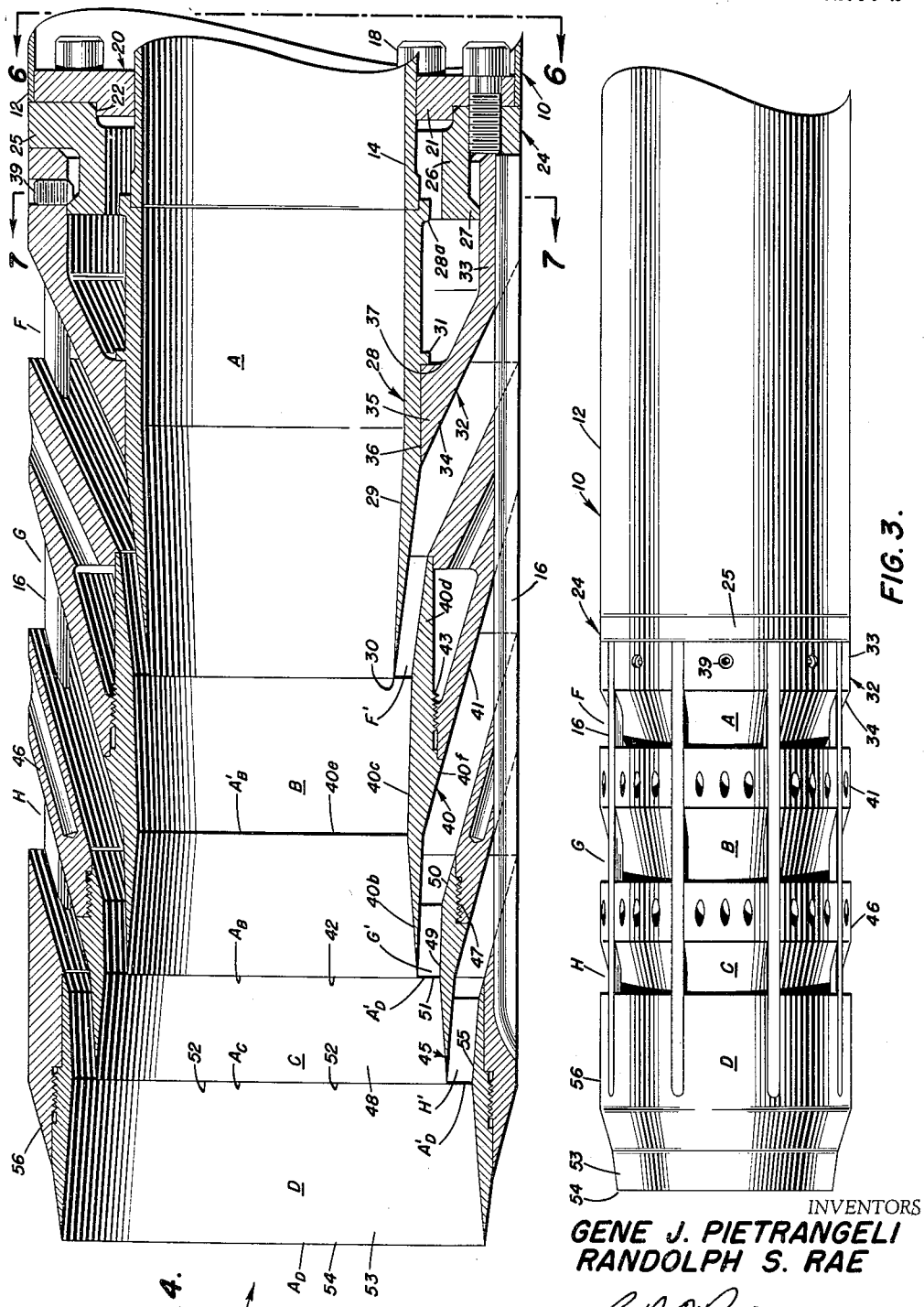

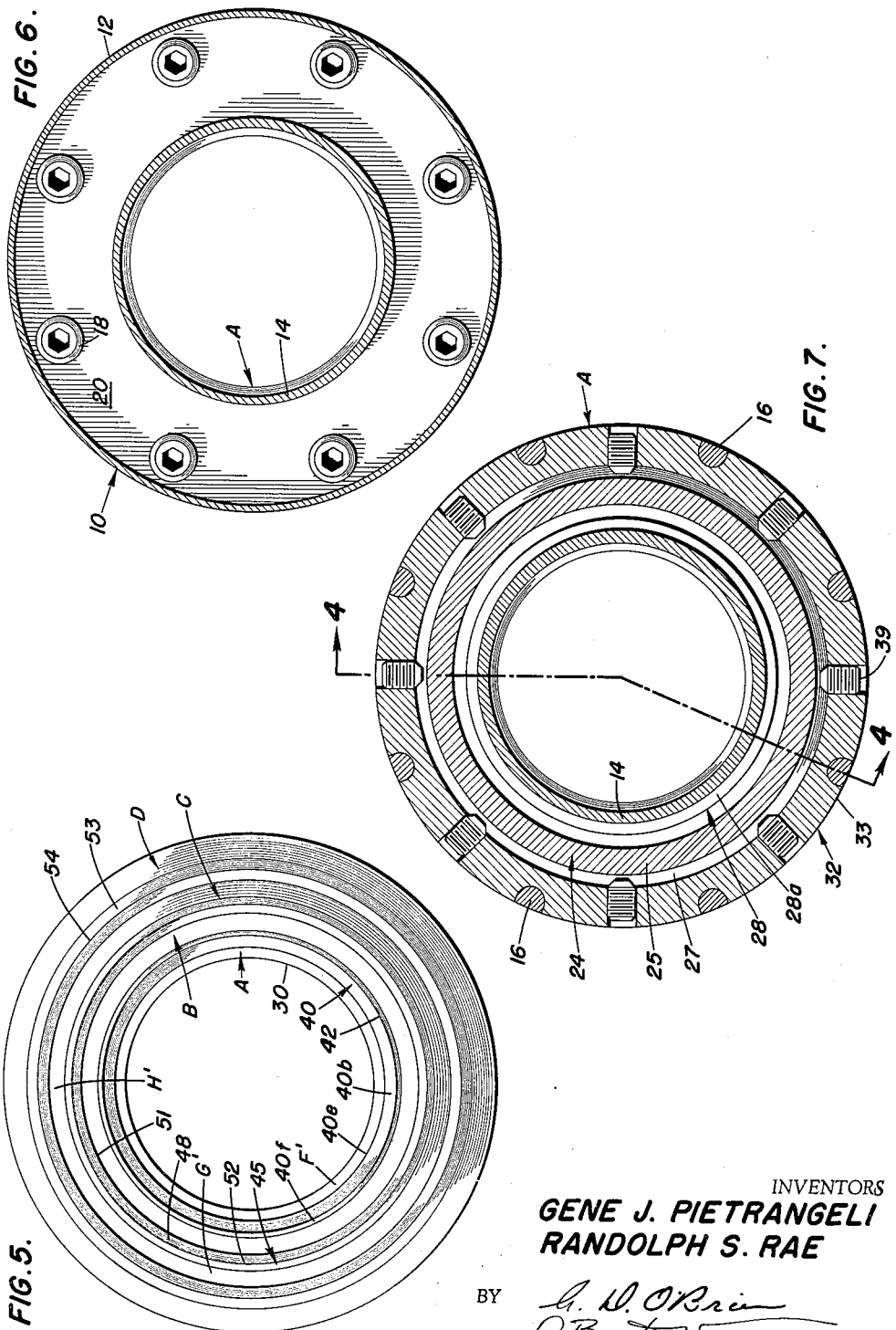

United States Patent Office 3,023,571
Patented Mar. 6, 1962

3,023,571
CASCADE DIFFUSER
Gene J. Pietrangeli, Silver Spring, Md., and Randolph S. Rae, Santa Monica, Calif., assignors to the United States of America as represented by the Secretary of the Navy
Filed July 20, 1955, Ser. No. 523,397
2 Claims. (Cl. 60—35.6)

The present invention relates generally to aerial vehicles of the ramjet type and more particularly to improvements in diffusers for such vehicles.

In ramjet engines, diffusers are employed to slow air approaching the ramjet from supersonic speeds to subsonic speeds so that combustion can take place in the vehicle's combustion chamber. As the air is slowed, an increase in the static pressure occurs, thereby enabling the engine to deliver thrust for the vehicle. It is desirable to accomplish the function of the diffuser as efficiently as possible. A measure of the diffuser efficiency is the pressure recovery of the diffuser, i.e., the ratio of the total pressure inside the combustion chamber to the total pressure of the free air stream approaching the diffuser.

A well-known type of diffuser is the Oswatitsch diffuser which, from the point of view of high pressure recovery, is to be recommended. An undesirable feature of this design, however, is its instability (buzz) in the subcritical operating region. Such oscillation or buzz is characterized by the alternate inward and outward movement of gases to and from the vehicle at its forward end. Pressure fluctuations will thus take place in the combustion chamber, with consequent inefficient burning of fuel.

Another known diffuser is the "Normal Shock Diffuser," which is very stable in operation but which has a low pressure recovery at high Mach numbers. The pressure recovery of the normal shock diffuser can be increased significantly by the use of an appropriate convergent, or reverse DeLaval, nozzle in the forward section thereof. The reverse DeLaval diffuser frequently fails to operate satisfactorily for the reason that the shock wave, which must be swallowed for efficient operation, becomes expelled from the throat of the nozzle for one reason or another. Since the shock wave once expelled will ordinarily not be reswallowed in the most efficient reverse DeLaval nozzle designs, such designs are not practiced.

One of the principal objects of the present invention, therefore, is to provide a diffuser which will possess the stability characteristics of the "Normal Shock Diffuser" and be capable of pressure recoveries favorably comparing with those of the Oswatitsch diffuser.

Another object of the invention is to provide a modified reverse DeLaval type diffuser which is capable of reswallowing an expelled shock wave.

Still another object of the present invention is to provide a modified reverse DeLaval type diffuser which operates with a near sonic throat velocity and which is capable of reswallowing an expelled shock wave at supersonic speeds.

Figure 2:
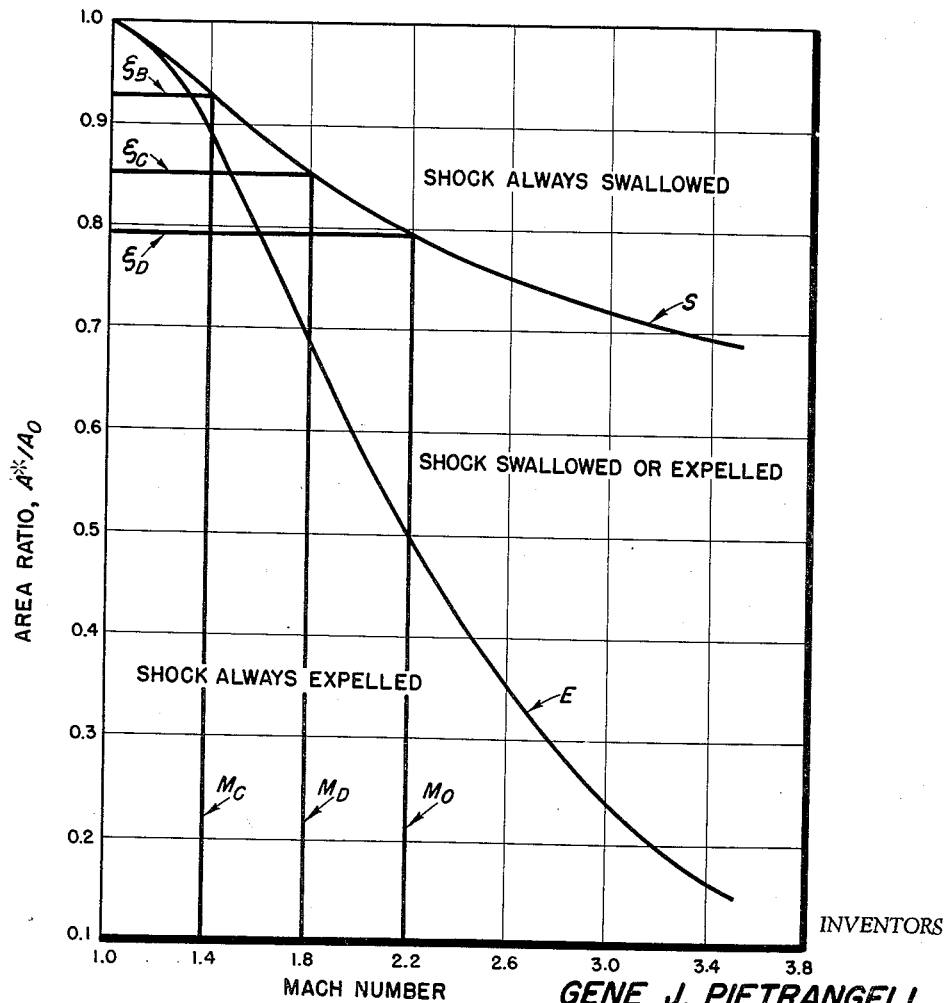

Other objects and many of the attendant advantages of this invention will be readily appreciated as the same becomes better understood by reference to the following detailed description when considered in connection with the accompanying drawings, wherein:

FIG. 1 is an axial section of a typical ramjet incorporating a prior art diffuser of the reverse DeLaval type;
FIG. 2 is a chart of area ratio v. Mach number which is useful in explaining the present invention;
FIG. 3 is a side elevation of the improved diffuser;
FIG. 4 is an axial section on the line 4—4 of FIG. 5;
FIG. 5 is a front elevation;
FIG. 6 is a section on the line 6—6 of FIG. 4; and
FIG. 7 is a section on the line 7—7 of FIG. 4.

In FIG. 1, an axial section of a simplified ramjet vehicle appears. The vehicle includes three general sections which are: I, the diffuser section for slowing and compressing the combustion air charge, II, the combustion section, and III, the exhaust nozzle section.

The diffuser section I includes a diffuser 10 of the reverse DeLaval type. Inasmuch as the present invention comprises a modification of the reverse DeLaval type diffuser, an understanding of the advantages and shortcomings thereof will lead measurably to increased understanding of the invention. The operation of the diffuser 10 will therefore be considered hereinafter.

The combustion section II receives the air charge compressed by the diffuser, mixes the air charge with fuel, and ignites the combustible mixture to provide energy for propulsion.

The nozzle section III exhausts the hot combustion products from the vehicle thereby delivering reactive propelling forces to the vehicle.

As is well understood, efficient ramjet operation requires that the kinetic energy of the free stream air be converted into potential energy with as little loss as possible. Normal shock diffusers are quite inefficient at higher speeds since considerable loss is incurred in the sudden conversion from a high Mach number to a subsonic Mach number as the air traverses the normal shock wave. In the reverse DeLaval diffuser, however, the free stream air, having a high Mach number $M_0$, is first slowed to near sonic speed by the convergent nozzle before the normal shock wave is encountered. Thus, losses across the shock wave are negligible and the pressure recovery, and hence efficiency, is increased.

The exact location of the normal shock wave depends upon the vehicle flight conditions. Ideally, the shock wave would always lie at the diffuser throat where the Mach number is equal to 1.0 and thus provide a diffuser pressure recovery of 100%. However, the shock wave cannot be maintained precisely at the throat because the varying demands of the combustor for air give rise to static pressure variations in the central duct 14. Increases in duct static pressure cause the shock wave to move forward and may be sufficient to move the shock wave forward of the throat. If such be the case, the shock wave will be immediately expelled from the diffuser and will not reenter the diffuser even after the static pressure is reduced.

When the shock wave is expelled, the pressure recovery is abruptly reduced from near 100% to the value obtainable with normal shock at the free stream Mach number. Thus, for example, for a vehicle traveling at $M=2$, the pressure recovery drops from approximately 100% to about 70%.

After expulsion of the wave, flow within the diffuser will be subsonic and due to the temperature rise across the wave, the air will have a lowered density. The throat area is then insufficient to handle a mass flow which will permit reswallowing of the shock wave. It is only by an enlargement of the throat area or an increase in Mach number, that a swallowed shock wave can again be established.

Frequently, the loss in pressure recovery due to the expulsion of the shock wave is of such magnitude that the thrust necessary to increase vehicle speed cannot be obtained. Moreover, variable speed operation is undesirable in a pilotless aircraft, as it greatly complicates the instrumentation thereof. It is preferable, therefore, to provide a diffuser having a variable throat area to permit reswallowing of the expelled shock wave.

According to the present invention, which may be seen in FIG. 3, a plurality of axially spaced diffuser elements decreasing in inner diameter, or throat area, from front to rear are provided. All except the rearmost of the elements are vented to the atmosphere to permit spillage of excess air and thereby effectively increase the throat area to permit shock swallow. The successive diffuser elements are designated in FIG. 3 as A, B, C, and D.

As the construction of the invention is relatively straightforward the detailed description thereof is reserved to follow consideration of FIG. 2, wherein the operation of the invention is graphically illustrated.

In FIG. 2, the ratio of the throat area to capture area is plotted against the Mach number. Two solid line curves, E and S, are plotted which indicate the boundary values for the area ratio below which the shock wave will always be expelled (curve E) and above which the shock wave will always be swallowed (curve S).

Curve E is a plot of the equation $$\frac{A_0}{A^*} = \frac{1}{M_0}\left[\frac{\frac{\gamma-1}{2}M_0^2+1}{\frac{\gamma+1}{2}}\right]^{\frac{\gamma+1}{2(\gamma-1)}} \quad (1)$$

which can be developed from equations of fluid theory upon the assumption that the nozzle compression is isentropic and that $M^*$, the throat Mach number, equals one.

The equation for the curve S is $$\frac{A_0}{A^{*\prime}} = \frac{P^*}{P_0}\frac{A_0}{A^*} \quad (2)$$

which follows Equation 1 from the theory of continuity of mass flow. In Equations 1 and 2, $M_0$ is the free stream Mach number;
$\gamma$ is the ratio of specific heats;
$A_0$ is the capture area;
$A^*$ is the throat area;
$A^{*\prime}$ is the throat area necessary to permit swallowing of an expelled shock wave; and
$\frac{P^*}{P_0}$ is the loss in pressure recovery across a normal shock wave at the free stream Mach number $M_0$.

For area ratios greater than the values represented by curve S, the wave will always be swallowed and for area ratios below the values of curve E, the wave will always be expelled. The area bounded by the curves E and S represents a condition wherein the waves may be either swallowed or expelled according to the initial conditions. That is, suppose that a diffuser having variable throat geometry is operating at $M_0=2.2$ with an area ratio of 1.0. Under these conditions, the shock wave will always be swallowed and the throat may be constricted to an area ratio of 0.5 while still retaining the shock wave swallowed. However, if the throat is further constricted, the wave will be expelled and will not reenter the diffuser until the area ratio is increased to a value of approximately 0.8. Therefore, for a diffuser having a fixed area ratio, it is prudent to provide an area ratio somewhat greater than the values represented by curve S. Of course, such an area ratio would not represent the value required to achieve optimum pressure recovery, since the Mach number at the throat would always then be greater than one. The curve E represents the area ratios necessary for optimum pressure recovery, since those ratios are computed for a throat Mach number of one with isentropic flow upstream of the throat.

In accordance with the present invention, the plurality of successive diffuser elements A, B, C, and D are constructed such that the forwardmost element D possesses an area ratio lying on the curve S at the design Mach number. At the throat of diffuser element D, the air has been slowed to a new Mach number $M_D$. At this Mach number a new and increased area ratio is required to assure swallowing, hence the diffuser element C has an area ratio above or equal to the values of curve S at $M_D$ Mach number. The element C reduces the Mach number still more to the value $M_C$ which requires an increased area ratio for the diffuser element B. After three successive elements the air will be slowed to the point where a normal shock wave can be tolerated without undue loss in pressure recovery. Hence the element A may suitably be slightly divergent thereby affording certain swallowing of any shock wave immediately forward of said element.

The operation of the diffuser is further illustrated in FIG. 2, where the various area ratios are assumed as follows:

$$\xi_d = \frac{A'_d}{A_d}$$

$$\xi_c = \frac{A'_c}{A_c}$$

$$\xi_b = \frac{A'_b}{A_b}$$

The areas $A'_b$, $A'_c$, and $A'_d$ represent the areas at the throat of the respective diffuser elements, while the areas $A_b$, $A_c$, and $A_d$ represent the area at the entrance to the respective elements. Since, in general, the reduction in Mach number achieved in an element depends upon its length as well as its area ratio, the points chosen on the chart of FIG. 2 are merely to illustrate the operation of the invention rather than to indicate that a given Mach number will obtain as a result of the choice of area ratio.

Therefore, assuming that the diffuser is intended to operate at a free stream Mach number $M_0$ of 2.2 then $\xi_d$ of 0.8 or greater is required. The diffuser element D slows the air, say to $M_D=1.8$. The diffuser element C therefore requires an area ratio $\xi_c$ of approximately 0.86. The element C slows the air further to, say, $M_C=1.4$. An area ratio $\xi_b$ of approximately 0.94 is therefore required for element B.

It will be observed that after passage through the elements D, C, and B, the Mach number has been reduced to the point of convergence of the curves E and S.

Further, it can be seen that if for some reason the shock wave is expelled, the element D possesses an area ratio sufficiently large to cause swallowing. As the wave is swallowed it encounters the element C which likewise has an area ratio which will permit swallowing. And so the expelled shock wave is reswallowed by the successive diffuser elements until the shock wave is located within the rear element A wherein the area ratio lies close to the curve E and hence the pressure recovery for normal shock is high.

The construction of the invention will now be described in detail.

The diffuser element A is attached to the forward end of the vehicle by bolts 18 which pass through a bulkhead ring 20 welded or otherwise suitably secured to the vehicle. The ring 20 includes a base portion 21 which surrounds the forward end of the combustion chamber 14, and a shoulder 22 for engagement in a recess formed in the inner wall of a mounting ring 24. The ring 24 is of generally L-shape cross-section and has a relatively thick portion 25, the outer end face of which is disposed flush with the outer surface of the vehicle, and a relatively thin portion 26 terminating in a shoulder 27.

Diffuser element A includes a tubular diffusing member 28, which is tapered from substantially its midpoint to its forward end, and which has a wall 29 reduced in thickness toward said forward end to define a conical inlet and a sharp lip 30. Formed on the outer surface of the diffusing member 28 rearwardly of its midsection is an annular flange 31, the purpose for which will be described hereinafter. The member 28 is also provided at its rear end with an annular thickened portion 28a which, as best seen in FIG. 4, is recessed to receive the forward end of the central duct 14.

The diffuser element A also includes a body or ring 32 having a cylindrical rear section 33 and a frustro-conical forward section 34. The forward section terminates in a thickened portion 35 having a cylindrical inner face 36 and a shoulder 37. When assembled, the diffuser element A is positioned with the rear end of the diffusing member in engagement with the forward end of the central duct 14 and the rear end portion of the section 33 of the body 32 surrounding the portion 26 of the ring 24. In this position the shoulder 37 will abut the flange 31 for preventing forward movement of the diffusing member 28 with respect to the central duct. As best seen in FIG. 4, the cylindrical face 36 of the thickened portion 35 will engage the midsection of said diffusing member for rigidly supporting said member in axial relation to the central duct. The diffuser element A is mounted in operative position on the ring 24 by setscrews 39 which are carried in the cylindrical portion 33 of the ring 32 and which engage behind the shoulder 27. As best seen in FIG. 3, the setscrews 39 are arranged in an annular series. As will be clear after a scrutiny of FIG. 3, the screws 39 not only retain the diffuser element A in place but also mount the entire diffuser on the missile, since the diffuser elements A, B, C, and D are interconnected by the struts 16.

The diffuser element B includes a tubular diffusing member 40, of greater diameter than the diffusing member 28, and a frusto-conical ring 40 tapered in thickness from near its midpoint toward its forward and rear ends, the forward end terminating in a sharpened lip 42. The inner surface of the wall is shaped to form a conical inlet 40b, a central portion 40c having an outward flare, and a conical exit portion 40d. The portions 40b and 40c form a slight constriction at 40e. As best seen in FIG. 3, the exit portion 40d surrounds the forward end portion of the diffusing member 28 in spaced relation thereto to form an entrance throat F' for the exit opening F.

The ring member 41 is screwed on the diffusing member 40, the cooperating screw threads being shown at 43. Said ring member 41 cooperates with a frusto-conical surface 40f on the diffusing member 40 to define an obliquely rearwardly disposed wall for the exit opening G, said wall terminating at its inner end in a plane transverse to the vehicle axis, at the constriction 40e. The conical inlet 40b extends into the diffusing member 45 of the diffuser element C and cooperates therewith to define an entrance throat G' for the exit opening G.

The diffuser element C includes a ring member 46 which is screwed on the diffusing member 45, the screw threads being shown at 47. The diffusing member 45, like the diffusing member 40 of the element B, has a conical inlet, shown at 48. The diffusing member 45 is also provided with a cylindrical central portion 49 and a flared rear portion 50, the conical inlet and the central portion cooperating to form a restriction 51. Like the diffuser elements A and B, the element C is formed with a sharpened lip 52 on the forward end of the diffusing member 45.

The forwardmost diffuser element D includes a diffusing member 53 having a conical inlet and a flared rear portion 55 which surrounds the conical inlet 48 of the diffusing element 45 in spaced relation thereto, to define an entrance throat H' for the exit opening H. Medially of its length the member 53 is provided with threads to mate with similar threads on a ring member 56. The forward end portions of the members 53 and 56 are tapered but at different angles, the taper on the member 56 being sharper than that on the member 53. At its forward end the diffusing member 53 terminates in a sharpened lip 54.

In operation, air enters the diffuser D at the lip 54 at a high Mach number. As a consequence of the decreasing diameters of the successive diffuser elements D, C, B, and A in cascade (in that order), this high Mach number air flow is redcued sufficiently in speed so that, from the point of view of pressure recovery, a normal shock can be tolerated at the lip 30, or attached to the conical surface 29 of the diffusing member 28. The annular exit openings E, F, and G have been so selected that if this normal shock is blown out ahead of the lip 30 (due to an erratic pressure disturbance in the diffuser exit 14) the shock will reenter the cascade and again assume its former position on the wall of the portion 29.

As would be expected, spillage from the exits contributes to the diffuser drag and therefore the high theoretical pressure recovery is not had at no sacrifice over the performance of a conventional reverse DeLaval type diffuser. The price paid in increased drag however is possibly overcome by the advantage of certain shock swallowing in the event of shock expulsion. Moreover, the present invention, contrary to the Oswatitsch type diffuser, is untroubled by the occurrence of instability (buzz).

Obviously many modifications and variations of the present invention are possible in the light of the above teachings. It is therefore to be understood that within the scope of the appended claims the invention may be practiced otherwise than as specifically described.

What is claimed is:

1. In a diffuser, a plurality of diffuser elements each having a diffusing member and a ring, the diffusing members being of progessively smaller inside diameters from the forward end of the diffuser to the rear end thereof and the forward portions of said members extending into the diffusing members of adjacent diffuser elements to define annular exit openings, struts mounting the elements in cooperating relation, and means for connecting the diffuser to a ramjet vehicle, said means including a bulkhead ring on the ramjet vehicle, a mounting ring on the diffuser, and means connecting the mounting ring to the bulkhead ring.

2. The combination with a ramjet vehicle having inner and outer members, said inner member including a central duct and a combustion chamber, of a diffuser having a plurality of diffuser elements, means mounting the elements in axially spaced relation, the rear-most of the elements including a diffusing member connected to the central duct, a ring surrounding the diffusing member, a bulkhead ring on the vehicle, a mounting ring, means securing the mounting ring to the bulkhead ring, and means securing the ring of the rear-most diffuser element to the mounting ring.

References Cited in the file of this patent

UNITED STATES PATENTS 2,589,945     Leduc _____ Mar. 18, 1952

FOREIGN PATENTS 439,805     Great Britain _____ Dec. 6, 1935